US005944046A

United States Patent [19]

Hultine

[11] Patent Number: 5,944,046

[45] Date of Patent: Aug. 31, 1999

[54] DUMP VALVE APPARATUS

[75] Inventor: William Hultine, Bellville, Wis.

[73] Assignee: Monroe Truck Equipment Inc., Monroe, Wis.

[21] Appl. No.: 08/931,168

[22] Filed: Sep. 16, 1997

[51] Int. Cl.[6] .............. F16K 3/04

[52] U.S. Cl. .............. 137/351; 251/14; 251/62; 251/144; 251/228; 251/300

[58] Field of Search .............. 251/228, 299, 251/300, 14, 58, 62; 137/899, 351

[56] References Cited

U.S. PATENT DOCUMENTS

| | | | |
|---|---|---|---|
| 1,512,638 | 10/1924 | Robinson | 137/351 |
| 2,942,839 | 6/1960 | Smith | 251/144 |
| 4,552,181 | 11/1985 | Hawkins | 137/875 |
| 5,634,487 | 6/1997 | Downey | 251/144 |

*Primary Examiner*—A. Michael Chambers
*Attorney, Agent, or Firm*—David J. Archer

[57] ABSTRACT

A dump valve apparatus is disclosed for dumping water from a firetruck. The apparatus includes a flange sealingly secured to the firetruck, the flange defining an opening for the flow therethrough of the water. A faceplate has an inner and an outer face which define an aperture, the faceplate cooperating with the flange. A seal is disposed between the flange and the inner face of the faceplate such that when the faceplate is urged towards the flange, the flange and the inner face are sealed relative to each other. A dump valve chute is rigidly secured to the faceplate and extends through the aperture of the faceplate, the dump chute defining a valve seat. A hinge has a proximal and a distal end, the proximal end being pivotally connected to the inner face of the faceplate. The hinge freely pivots within the opening of the flange. A valve door has an inner and an outer surface, the valve door being pivotally secured to the hinge between the proximal and distal ends thereof. A seal is secured to the outer surface of the valve door, the seal being disposed between the outer surface of the valve door and the valve seat. The arrangement is such that when the hinge is disposed in a closed disposition thereof, the seal sealingly cooperates with the valve seat for inhibiting the flow of the water from the firetruck and when the hinge is pivoted to an open disposition thereof, the hinge pivots through the opening of the flange so that the valve door and the seal are urged away from the valve seat for permitting dumping of the water from the firetruck through the opening and the dump valve chute.

30 Claims, 3 Drawing Sheets

DUMP VALVE APPARATUS

BACKGROUND OF THE INVENTION

1. Field of the Invention

The present invention relates to a dump valve apparatus for dumping water from a firetruck.

More specifically, the present invention relates to a dump valve apparatus which enables the rapid dumping of several thousand gallons of water from a firetruck at the site of a fire.

2. Information Disclosure Statement

Dump valves are installed in firetrucks in order to permit the rapid dumping of large quantities of water from the firetruck within a few second so that such water can be pumped to a holding tank for subsequent pumping to firehoses and the like for fighting a fire.

The dump valve apparatus of the present invention greatly simplifies the attachment of such dump valve apparatus to a firetruck thereby reducing the installation costs thereof.

Therefore, it is a primary objective of the present invention to provide a dump valve apparatus that overcomes the problems associated with the prior art dump valves and which makes a considerable contribution to the art of firefighting.

Other objects and advantages of the present invention will be readily apparent to those skilled in the art by a careful consideration of the detailed description contained hereinafter taken in conjunction with the annexed drawings.

SUMMARY OF THE INVENTION

The present invention relates to a dump valve apparatus for dumping water from a firetruck. The apparatus includes a flange sealingly secured to the firetruck, the flange defining an opening for the flow therethrough of the water.

A faceplate has an inner and an outer face which define an aperture, the faceplate cooperating with the flange.

A seal is disposed between the flange and the inner face of the faceplate such that when the faceplate is urged towards the flange, the flange and the inner face are sealed relative to each other.

A dump valve chute is rigidly secured to the faceplate and extends through the aperture of the faceplate. The dump chute also defines a valve seat.

A hinge means has a proximal and a distal end, the proximal end being pivotally connected to the inner face of the faceplate. The hinge means freely pivots within the opening of the flange.

A valve door has an inner and an outer surface, the valve door being pivotally secured to the hinge means between the proximal and distal ends thereof.

A sealing means is secured to the outer surface of the valve door, the sealing means being disposed between the outer surface of the valve door and the valve seat. The arrangement is such that when the hinge means is disposed in a closed disposition thereof, the sealing means sealingly cooperates with the valve seat for inhibiting the flow of the water from the firetruck. When the hinge means is pivoted to an open disposition thereof, the hinge means pivots through the opening of the flange so that the valve door and the sealing means are urged away from the valve seat for permitting dumping of the water from the firetruck through the opening and the dump valve chute.

In a more specific embodiment of the present invention, the flange is of rectangular configuration and the flange is welded to the firetruck.

Also, the opening is of rectangular configuration, the opening being symmetrically disposed within the flange.

Additionally, the flange further includes fastening means for fastening the faceplate to the flange such that the seal is compressed between the flange and the inner face of the faceplate.

More particularly, the fastening means includes a plurality of threaded bolts extending from the flange and disposed around the opening.

The faceplate is of rectangular configuration having substantially the same outer configuration and dimensions as the flange.

The aperture has a length which is less than the width of the opening. The aperture cooperates with the opening and is aligned with the opening in order to allow the flow therethrough of the water.

Also, the faceplate defines a plurality of holes for the reception therein of the plurality of bolts, the holes being disposed around the aperture.

The seal is fabricated from a rubber composite and is of rectangular configuration, the seal and the flange having substantially the same configuration and dimensions.

Additionally, the seal defines an orifice which is aligned with the opening such that when the inner face of the faceplate is urged towards the flange, the orifice co-operates with the opening and the aperture for permitting the flow of water therethrough.

The dump valve chute is of elongate tubular configuration, and has an inner and an outer end. The inner end of the chute defines the valve seat.

Moreover, the dump valve chute is of rectangular cross-sectional configuration, with the inner end of the chute protruding through the aperture such that the valve seat co-operates with the sealing means.

The dump valve chute defines a passageway which extends from the inner end to the outer end thereof for the flow therethrough of the water.

Also, the dump valve chute is welded to the faceplate, with the chute extending through the aperture.

The hinge means includes a first bar mounting rigidly secured to the inner face of the faceplate. A second bar mounting is rigidly secured to the inner face of the faceplate, the second bar mounting being spaced from the first bar mounting.

A first hinge arm has a proximal and a distal end. The proximal end is pivotally connected to the first bar mounting. A second hinge arm has a proximal and a distal extremity, the proximal extremity being pivotally connected to the second bar mounting. A tie bar extends between the distal end and extremity, the arrangement being such that the bar mountings are disposed within the opening so that pivoting of the hinge means within the opening is permitted.

The valve door includes a first ear extending away from the inner surface, the first ear being pivotally secured to the first hinge arm between the proximal and distal ends thereof.

A second ear extends away from the inner surface, the second ear being spaced from the first ear. The second ear is pivotally secured to the second hinge arm between the proximal and distal extremities thereof, the arrangement being such that when the hinge arms are pivoted, the valve door is moved relative to the valve seat between the open and closed dispositions thereof.

Also, the sealing means is fabricated from a rubber composite, the sealing means being slightly larger than the valve seat so that leakage of the water between the sealing means and the valve seat is inhibited when the hinge means is disposed in the closed disposition.

The valve door further includes a bracket rigidly secured to the outer surface and extending through the sealing means.

The apparatus further includes an actuating means which is connected to the valve door for selectively moving the valve door between the closed and the open disposition.

More specifically, the actuating means is pivotally connected to the bracket of the valve door for selectively moving the valve door between the closed and the open dispositions thereof.

In one embodiment of the present invention, the actuating means is manually operable.

In another embodiment of the present invention, the actuating means is electro pneumatically operated.

The electro pneumatic actuating means further includes a manual override mechanism.

Also, the actuating means further includes a first and a second actuating arm pivotally secured relative to each other. The first actuating arm is driven and the second actuating arm is pivotally secured to the bracket. The arrangement is such that when the door is moved to the open disposition, the actuating arms interact to lock the valve door in the open disposition until the actuating means selectively moves the valve door to the closed disposition so that injury to an operating personnel due to the flow of water through the dump valve apparatus reversing the manual operation is avoided.

Many modifications and variations of the present invention will be apparent to those skilled in the art by a careful consideration of the detailed description contained hereinafter taken in conjunction with the annexed drawings which show a preferred embodiment of the present invention.

However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
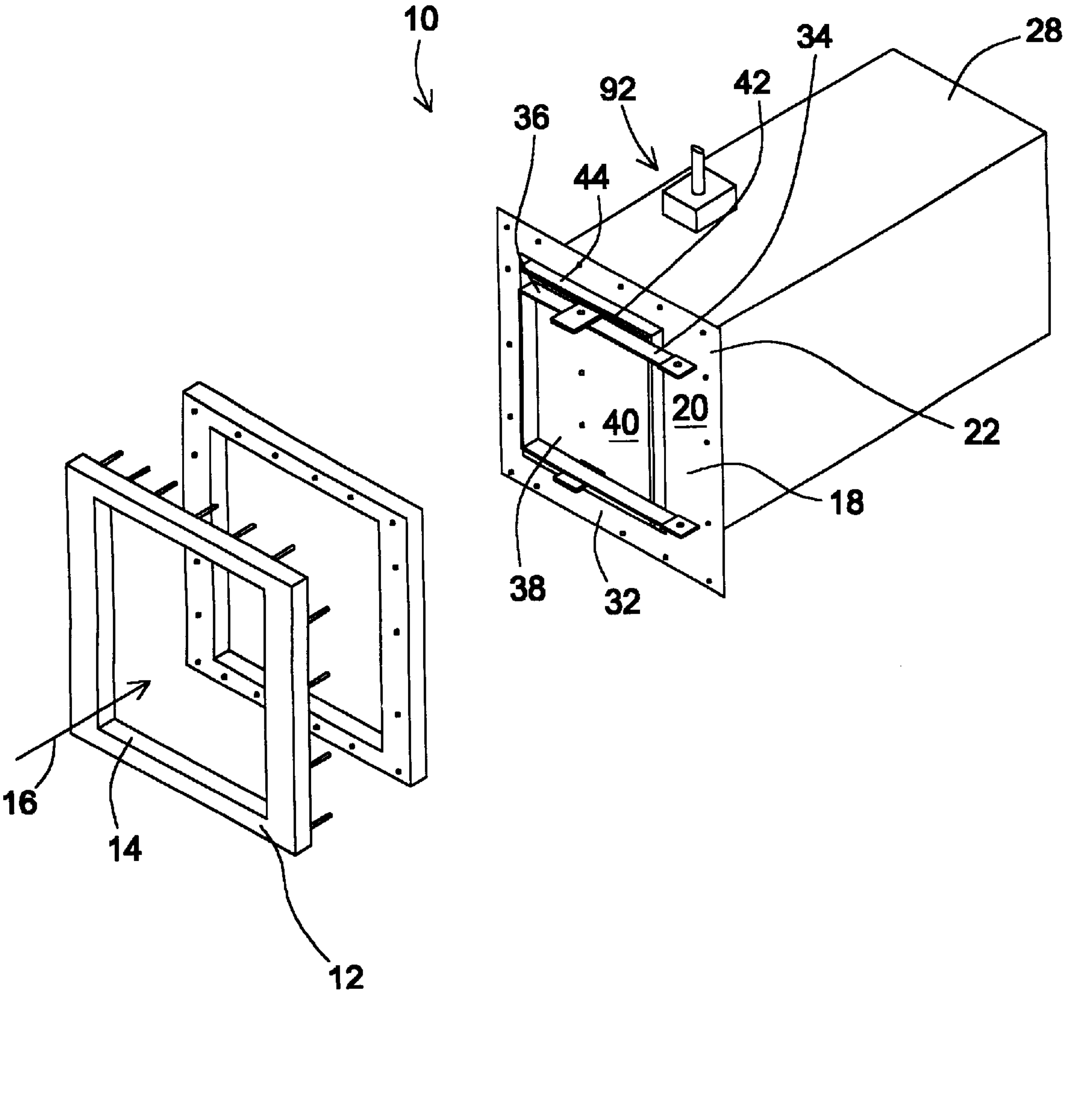
FIG. 1 is an exploded view partially cut away, of a dump valve apparatus of the present invention in the closed disposition thereof.

FIG. 1 is an exploded view partially cut away, of a dump valve apparatus generally designated 10 according to the present invention for dumping water from a firetruck (not shown). The apparatus 10 includes a flange 12 sealingly secured to a firetruck. The flange 12 defines an opening 14 for the flow 16 therethrough of the water.

A faceplate 18 has an inner and an outer face 20 and 22 respectively which define an aperture 24. The faceplate 18 cooperates with the flange 12. A seal 26 is disposed between the flange 12 and the inner face 20 of the faceplate 18 such that when the faceplate 18 is urged towards the flange 12, the flange 12 and the inner face 20 are sealed relative to each other.

A dump valve chute 28 is rigidly secured to the faceplate 18 and extends through the aperture 24 of the faceplate 18. The dump chute 28 defines a valve seat 30.

A hinge means generally designated 32 has a proximal and a distal end 34 and 36 respectively. The proximal end is pivotally connected to the inner face 20 of the faceplate 18, the hinge means 32 freely pivoting within the opening 14 of the flange 12.

A valve door 38 has an inner and an outer surface 40 and 42 respectively. The valve door 38 is pivotally secured to the hinge means 32 between the proximal and distal ends 34 and 36 thereof.

A sealing means 44 is secured to the outer surface 42 of the valve door 38. The sealing means 44 is disposed between the outer surface 42 of the valve door 38 and the valve seat 30. The arrangement is such that when the hinge means 32 is disposed in a closed disposition thereof as shown in FIG. 1, the sealing means 44 sealingly cooperates with the valve seat 30 for inhibiting the flow 16 of the water from the firetruck. When the hinge means 32 is pivoted to an open disposition thereof as shown in FIG. 2, the hinge means 32 pivots through the opening 14 of the flange 12 so that the valve door 38 and the sealing means 44 are urged away from the valve seat 30 for permitting dumping of the water from the firetruck through the opening 14 and the dump valve chute 28.

Figure 2:
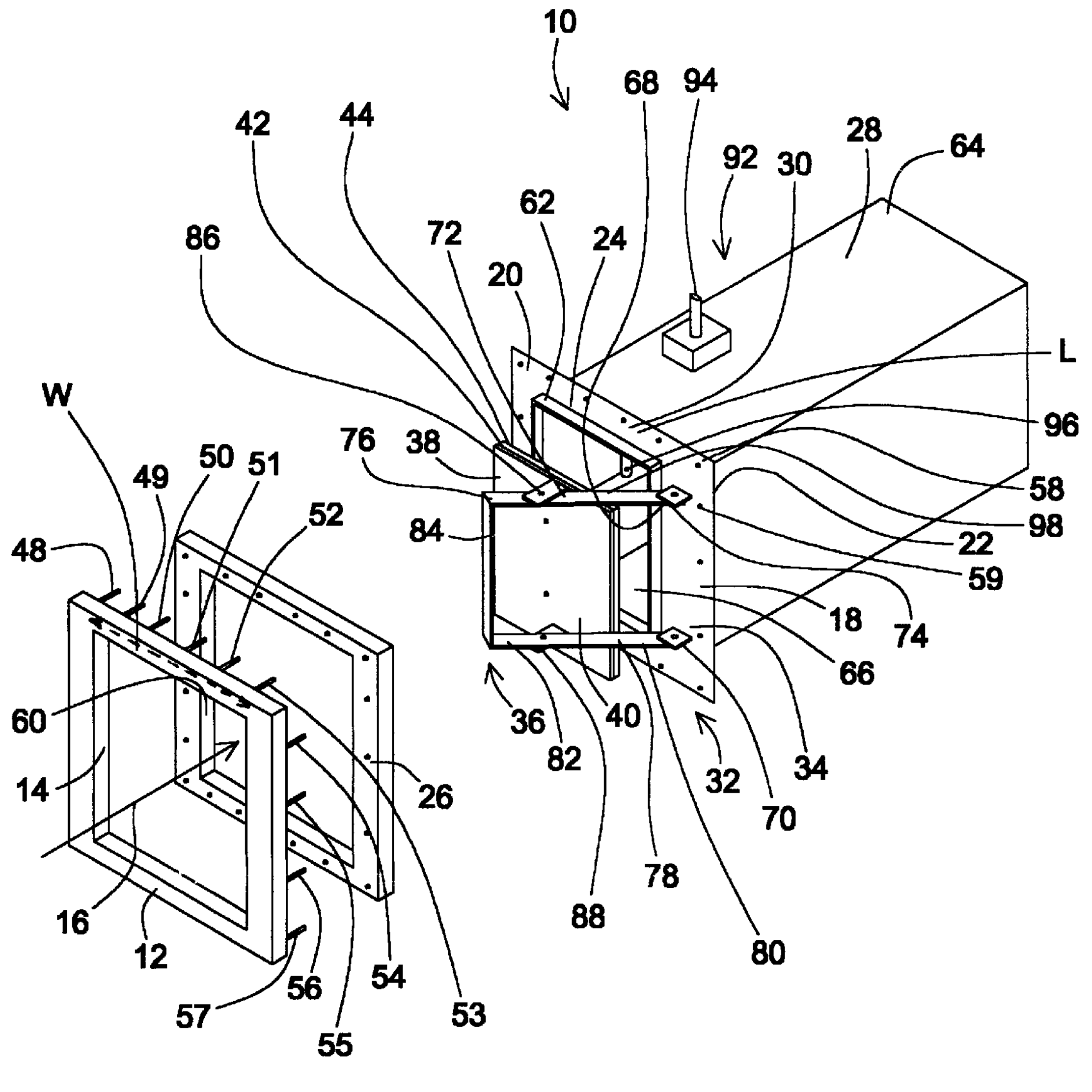
FIG. 2 is a similar view to that shown in FIG. 1 but shows the valve in the open disposition thereof.

FIG. 2 shows the valve 10 in the open disposition thereof. Additionally, FIG. 2 shows the flange 12 is of rectangular configuration and the flange 12 is welded to the firetruck.

Also, the opening 14 is of rectangular configuration, the opening 14 being symmetrically disposed within the flange 12.

Additionally, the flange 12 further includes fastening means generally designated 46 for fastening the faceplate 18 to the flange 12 such that the seal 26 is compressed between the flange 12 and the inner face 20 of the faceplate 18.

More particularly, the fastening means 46 includes a plurality of threaded bolts 48, 49, 50, 51, 52, 53, 54, 55, 56 and 57 extending from the flange 12 and disposed around the opening 14.

The faceplate 18 is of rectangular configuration having substantially the same outer configuration and dimensions as the flange 12.

The aperture 24 has a length L which is less than a width W of the opening 14. The aperture 24 co-operates with the opening 14 and is aligned with the opening 14 in order to allow the flow 16 therethrough of the water.

Also, the faceplate 18 defines a plurality of holes 58, 59 for the reception therein of the plurality of bolts 48–57, the holes 58, 59 being disposed around the aperture 24.

The seal 26 is fabricated from a rubber composite and is of rectangular configuration, the seal 26 and the flange 12 having substantially the same configuration and dimensions.

Additionally, the seal 26 defines an orifice 60 which is aligned with the opening 14 such that when the inner face 20 of the faceplate 18 is urged towards the flange 12, the orifice 60 co-operates with the opening 14 and the aperture 24 for permitting the flow 16 therethrough.

The dump valve chute 28 is of elongate tubular configuration, the chute 28 having an inner and an outer end 62 and 64 respectively. The inner end 62 defines the valve seat 30.

Moreover, the dump valve chute 28 is of rectangular cross-sectional configuration, the inner end 62 of the chute 28 protruding through the aperture 24 such that the valve seat 30 co-operates with the sealing means 44.

The dump valve chute 28 defines a passageway 66 which extends from the inner end 62 to the outer end 64 thereof for the flow 16 therethrough of the water.

Also, the dump valve chute 28 is welded to the faceplate 18, the chute 28 extending through the aperture 24.

The hinge means 32 includes a first bar mounting 68 rigidly secured to the inner face 20 of the faceplate 18. A second bar mounting 70 is rigidly secured to the inner face 20 of the faceplate 18, the second bar mounting 70 being spaced from the first bar mounting 68.

A first hinge arm 72 has a proximal and a distal end 74 and 76 respectively, the proximal end 74 being pivotally connected to the first bar mounting 68. A second hinge arm 78 has a proximal and a distal extremity 80 and 82 respectively, the proximal extremity 80 being pivotally connected to the second bar mounting 70. A tie bar 84 extends between the distal end and extremity 76 and 82 respectively, the arrangement being such that the bar mountings 68 and 70 are disposed within the opening 14 so that pivoting of the hinge means 32 within the opening 14 is permitted.

The valve door 38 includes a first ear 86 extending away from the inner surface 20, the first ear 86 being pivotally secured to the first hinge arm 72 between the proximal and distal ends 74 and 76 thereof.

A second ear 88 extends away from the inner surface 20, the second ear 88 being spaced from the first ear 86. The second ear 88 is pivotally secured to the second hinge arm 78 between the proximal and distal extremities 80 and 82 thereof. The arrangement is such that when the hinge arms 72 and 78 are pivoted, the valve door 38 is moved relative to the valve seat 30 between the open and closed dispositions.

Also, the sealing means 44 is fabricated from a rubber composite, the sealing means 44 being slightly larger than the valve seat 30 so that leakage of the water between the sealing means 44 and the valve seat 30 is inhibited when the hinge means 32 is disposed in the closed disposition.

The valve door 38 further includes a bracket 90 rigidly secured to the outer surface 42 and extending through the sealing means 44.

The apparatus 10 further includes actuating means generally designated 92 connected to the valve door 38 for selectively moving the valve door 38 between the closed and the open dispositions.

More specifically, the actuating means 92 is pivotally connected to the bracket 90 of the valve door 38 for selectively moving the valve door 38 between the closed and the open dispositions thereof.

In one embodiment of the present invention as shown in FIGS. 1 and 2, the actuating means 92 is electro pneumatically operated.

The actuating means 92 further includes a manual override mechanism 94.

Figure 3:
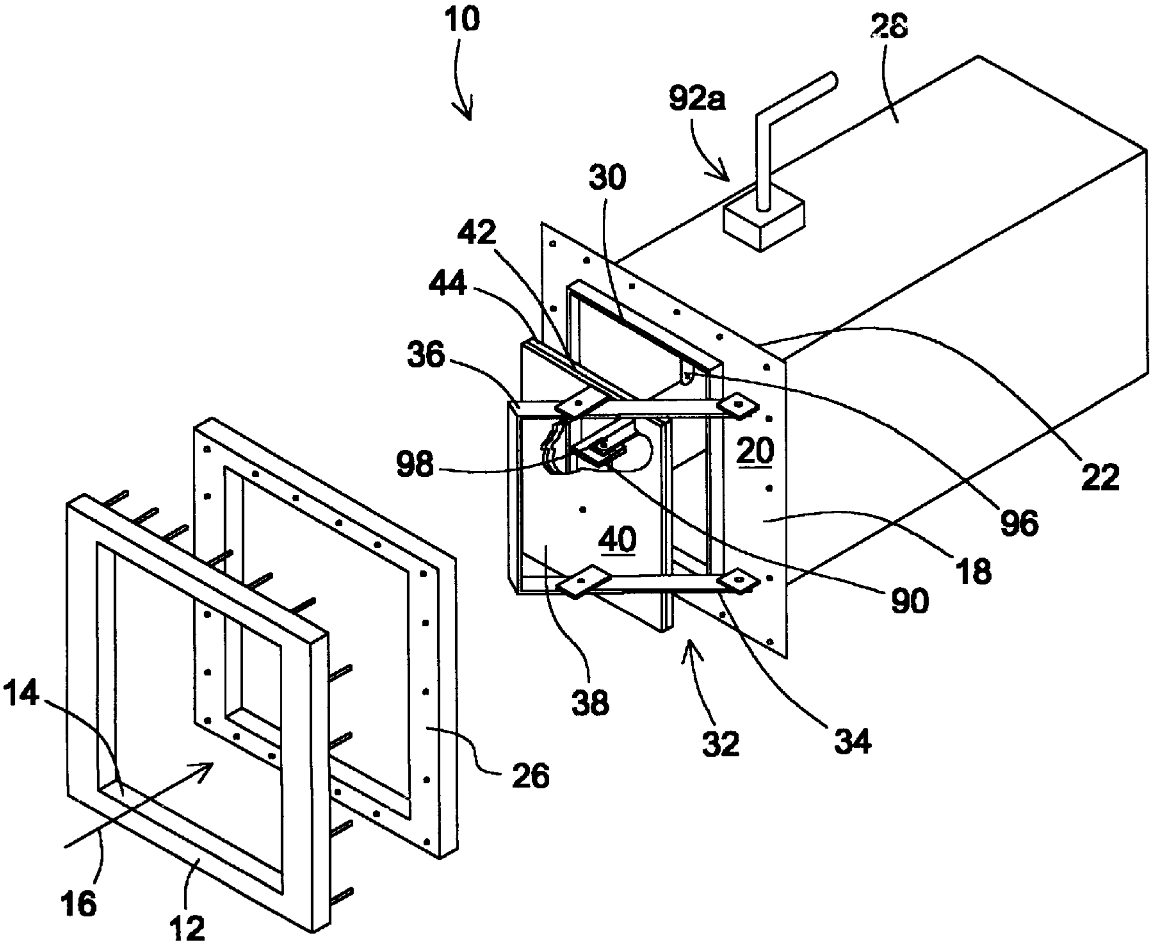
FIG. 3 is an exploded view of an alternative embodiment of the present invention.

In another embodiment of the present invention as shown in FIG. 3, the actuating means **92*a*** is manually operable.

Also, the actuating means 92 further includes a first and a second actuating arm 96 and 98 respectively which are pivotally secured relative to each other. The first actuating arm 96 is driven and the second actuating arm 98 is pivotally secured to the bracket 90. The arrangement is such that when the valve door 38 is moved to the open disposition, the actuating arms 96 and 98 interact to lock the valve door 38 in the open disposition until the actuating means 92 selectively moves the valve door 38 to the closed disposition so that injury to an operating personnel due to the flow 16 of water through the dump valve apparatus 10 reversing the manual operation is avoided.

The present invention provides a dump valve apparatus which is much easier to install than the prior art dump valves.

Also, the dump valve apparatus according to the present invention is easier to manufacture than the dump valves that are currently available.

What is claimed is:

1. A dump valve apparatus for dumping water from a firetruck, said apparatus comprising:

a flange sealingly secured to the firetruck, said flange defining an opening for the flow therethrough of the water;

a faceplate having an inner and an outer face which define an aperture, said faceplate cooperating with said flange;

a seal disposed between said flange and said inner face of said faceplate such that when said faceplate is urged towards said flange, said flange and said inner face are sealed relative to each other;

a dump valve chute rigidly secured to said faceplate and extending through said aperture of said faceplate, said dump chute defining a valve seat;

hinge means having a proximal and a distal end, said proximal end being pivotally connected to said inner face of said faceplate, said hinge means freely pivoting within said opening of said flange;

a valve door having an inner and an outer surface, said valve door being pivotally secured to said hinge means between said proximal and distal ends thereof; and sealing means secured to said outer surface of said valve door, said sealing means being disposed between said outer surface of said valve door and said valve seat, the arrangement being such that when said hinge means is disposed in a closed disposition thereof, said sealing means sealingly cooperates with said valve seat for inhibiting said flow of the water from the firetruck and when said hinge means is pivoted to an open disposition thereof, said hinge means pivots through said opening of said flange so that said valve door and said sealing means are urged away from said valve seat for permitting dumping of the water from the firetruck through said opening and said dump valve chute.

2. A dump valve apparatus as set forth in claim 1 wherein said flange is of rectangular configuration.

3. A dump valve apparatus as set forth in claim 1 wherein said flange is welded to the firetruck.

4. A dump valve apparatus as set forth in claim 1 wherein said opening is of rectangular configuration.

5. A dump valve apparatus as set forth in claim 1 wherein said opening is symmetrically disposed within said flange.

6. A dump valve apparatus as set forth in claim 1 wherein said flange further includes:

fastening means for fastening said faceplate to said flange such that said seal is compressed between said flange and said inner face of said faceplate.

7. A dump valve apparatus as set forth in claim 1 wherein said fastening means includes:

a plurality of threaded bolts extending from said flange and disposed around said opening.

8. A dump valve apparatus as set forth in claim 7 wherein said faceplate defines a plurality of holes for the reception therein of said plurality of bolts, said holes being disposed around said aperture.

9. A dump valve apparatus as set forth in claim 1 wherein said faceplate is of rectangular configuration having substantially the same configuration and dimensions as said flange.

10. A dump valve apparatus as set forth in claim 1 wherein said aperture has a length which is less than a width of said opening, said aperture cooperating with said opening and being aligned with said opening in order to allow said flow therethrough of the water.

11. A dump valve apparatus as set forth in claim 1 wherein said seal is fabricated from a rubber composite.

12. A dump valve apparatus as set forth in claim 1 wherein said seal is of rectangular configuration, said seal and said flange having substantially the same configuration and dimensions.

13. A dump valve apparatus as set forth in claim 1 wherein said seal defines an orifice which is aligned with said opening such that when said inner face of said faceplate is urged towards said flange, said orifice co-operates with said opening and said aperture for permitting said flow therethrough.

14. A dump valve apparatus as set forth in claim 1 wherein said dump valve chute is of elongate tubular configuration, said chute having an inner and an outer end, said inner end defining said valve seat.

15. A dump valve apparatus as set forth in claim 14 wherein said dump valve chute is of rectangular cross-sectional configuration, said inner end of said chute protruding through said aperture such that said valve seat cooperates with said sealing means.

16. A dump valve apparatus as set forth in claim 14 wherein said dump valve chute defines a passageway which extends from said inner end to said outer end thereof for said flow therethrough of the water.

17. A dump valve apparatus as set forth in claim 1 wherein said dump valve chute is welded to said faceplate, said chute extending through said aperture.

18. A dump valve apparatus as set forth in claim 1 wherein said hinge means includes:

a first bar mounting rigidly secured to said inner face of said faceplate;

a second bar mounting rigidly secures to said inner face of said faceplate, said second bar mounting being spaced from said first bar mounting;

a first hinge arm having a proximal and a distal end, said proximal end being pivotally connected to said first bar mounting;

a second hinge arm having a proximal and a distal extremity, said proximal extremity being pivotally connected to said second bar mounting;

a tie bar extending between said distal end and extremity, the arrangement being such that said bar mountings are disposed within said opening so that pivoting of said hinge means within said opening is permitted.

19. A dump valve apparatus as set forth in claim 18 wherein said valve door includes:

a first ear extending away from said inner surface;

said first ear being pivotally secured to said first hinge arm between said proximal and distal ends thereof;

a second ear extending away from said inner surface, said second ear being spaced from said first ear;

said second ear being pivotally secured to said second hinge arm between said proximal and distal extremities thereof, the arrangement being such that when said hinge arms are pivoted, said valve door is moved relative to said valve seat between said open and closed dispositions.

20. A dump valve apparatus as set forth in claim 1 wherein said sealing means is fabricated from a rubber composite.

21. A dump valve apparatus as set forth in claim 1 wherein said sealing means is slightly larger than said valve seat so that leakage of the water between said sealing means and said valve seat is inhibited when said hinge means is disposed in said closed disposition.

22. A dump valve apparatus as set forth in claim 1 wherein said valve door further includes:

a bracket rigidly secured to said outer surface and extending through said sealing means.

23. A dump valve apparatus as set forth in claim 1 wherein said apparatus further includes:

actuating means connected to said valve door for selectively moving said valve door between said closed and said open disposition.

24. A dump valve apparatus as set forth in claim 22 wherein said apparatus further includes:

actuating means pivotally connected to said bracket of said valve door for selectively moving said valve door between said closed and said open dispositions.

25. A dump valve apparatus as set forth in claim 24 wherein said actuating means is manually operable.

26. A dump valve apparatus as set forth in claim 24 wherein said actuating means is electro pneumatically operated.

27. A dump valve apparatus as set forth in claim 26 wherein said actuating means further includes:

a manual override mechanism.

28. A dump valve apparatus as set forth in claim 25 wherein said actuating means further includes:

a first and a second actuating arm pivotally secured relative to each other, said first actuating arm being driven, said second actuating arm being pivotally secured to said bracket, the arrangement being such that when said door is moved to said open disposition, said actuating arms interact to lock said valve door in said open disposition until said actuating means selectively moves said valve door to said closed disposition so that injury to an operating personnel due to said flow of water through said dump valve apparatus reversing said manual operation is avoided.

29. A dump valve apparatus for dumping water from a firetruck, said apparatus comprising:

a flange sealingly secured to the firetruck, said flange defining an opening for the flow therethrough of the water;

a faceplate having an inner and an outer face which define an aperture, said faceplate cooperating with said flange;

a seal disposed between said flange and said inner face of said faceplate such that when said faceplate is urged towards said flange, said flange and said inner face are sealed relative to each other;

a dump valve chute rigidly secured to said faceplate and extending through said aperture of said faceplate, said dump chute defining a valve seat;

hinge means having a proximal and a distal end, said proximal end being pivotally connected to said inner face of said faceplate, said hinge means freely pivoting within said opening of said flange;

a valve door having an inner and an outer surface, said valve door being pivotally secured to said hinge means between said proximal and distal ends thereof;

sealing means secured to said outer surface of said valve door, said sealing means being disposed between said outer surface of said valve door and said valve seat, the arrangement being such that when said hinge means is disposed in a closed disposition thereof, said sealing means sealingly cooperates with said valve seat for inhibiting said flow of the water from the firetruck and when said hinge means is pivoted to an open disposition thereof, said hinge means pivots through said opening of said flange so that said valve door and said sealing means are urged away from said valve seat for permitting dumping of the water from the firetruck through said opening and said dump valve chute; and actuating means connected to said valve door for selectively moving said valve door between said closed and said open disposition.

30. A dump valve apparatus for dumping water from a firetruck, said apparatus comprising:

a flange sealingly secured to the firetruck, said flange defining an opening for the flow therethrough of the water;

a faceplate having an inner and an outer face which define an aperture, said faceplate cooperating with said flange;

a seal disposed between said flange and said inner face of said faceplate such that when said faceplate is urged towards said flange, said flange and said inner face are sealed relative to each other;

a dump valve chute rigidly secured to said faceplate and extending through said aperture of said faceplate, said dump chute defining a valve seat;

hinge means having a proximal and a distal end, said proximal end being pivotally connected to said inner face of said faceplate, said hinge means freely pivoting within said opening of said flange;

a valve door having an inner and an outer surface, said valve door being pivotally secured to said hinge means between said proximal and distal ends thereof;

sealing means secured to said outer surface of said valve door, said sealing means being disposed between said outer surface of said valve door and said valve seat, the arrangement being such that when said hinge means is disposed in a closed disposition thereof, said sealing means sealingly cooperates with said valve seat for inhibiting said flow of the water from the firetruck and when said hinge means is pivoted to an open disposition thereof, said hinge means pivots through said opening of said flange so that said valve door and said sealing means are urged away from said valve seat for permitting dumping of the water from the firetruck through said opening and said dump valve chute; and an electro pneumatic actuating means connected to said valve door for selectively moving said valve door between said closed and said open disposition, said actuating means including:

a manual override mechanism.

* * * * *